United States Patent [19]

Franke

[11] 4,118,774
[45] Oct. 3, 1978

[54] LOCOMOTIVE SPEED CONTROL APPARATUS

[75] Inventor: Raymond C. Franke, Shaler Township, Allegheny County, Pa.

[73] Assignee: Westinghouse Air Brake Company, Swissvale, Pa.

[21] Appl. No.: 797,088

[22] Filed: May 16, 1977

[51] Int. Cl.$^2$ .................. B60L 3/08; G05D 13/62
[52] U.S. Cl. ......................... 364/431; 104/152; 105/61; 318/590; 364/110; 364/114
[58] Field of Search ........... 364/431, 110, 114, 118; 318/587, 590, 593, 609, 610; 246/182 R, 187; 104/152; 105/61; 180/105 E

[56] References Cited

U.S. PATENT DOCUMENTS

| | | | |
|---|---|---|---|
| 3,218,456 | 11/1965 | Matthews | 246/187 |
| 3,601,605 | 8/1971 | Elder et al. | 246/182 R |
| 3,790,778 | 2/1974 | Oster | 105/61 R |
| 3,946,297 | 4/1976 | Bechtel | 318/609 |
| 3,998,191 | 12/1976 | Beyerlein et al. | 180/105 E |
| 4,008,386 | 2/1977 | Ross | 318/610 |
| 4,029,946 | 6/1977 | Gerstine et al. | 318/609 |

OTHER PUBLICATIONS

Westinghouse Air Brake Company: Service Manual 5907 for Low Speed Locomotive Regulation System LSR-1, Nov. 1974.

*Primary Examiner*—Felix D. Gruber
*Attorney, Agent, or Firm*—A. G. Williamson, Jr.; R. W. McIntire, Jr.

[57] ABSTRACT

An analog speed error signal, developed by comparing actual and desired speeds, is processed into a control voltage through a two condition circuit network. When the error signal is more than a predetermined percentage of the desired speed, the network has a unity gain and the control voltage equals the error signal. When the error signal becomes less than the predetermined percentage, the network is shifted into a hybrid form by inserting an integrator loop into the gain circuit so that the control voltage and error signal are not directly proportional. The control voltage is converted into a series of proportional width pulses which are applied to vary the generator output to control locomotive speed. The pulse width varies in part from the error signal variation but also in part from an acceleration signal to anticipate the achievement of desired speed. When the hybrid network is in use, the pulse width speed control feeds back to drive the error signal to zero. The control voltage and acceleration signal are also applied to a clock and reversible counter network which controls the locomotive throttle position. The counter steps up or down, to increase or decrease the throttle, at a clock frequency established by the absolute value of the control voltage whose polarity further designates the requirement for speed increase or decrease. A high level of acceleration, however, overrides to reverse the count direction to prevent overshooting the desired speed. A moderate acceleration level inhibits further counting and speed is then varied only by the pulse width modulation network.

12 Claims, 3 Drawing Figures

LOCOMOTIVE SPEED CONTROL APPARATUS

BACKGROUND OF THE INVENTION

My invention pertains to locomotive speed control apparatus. More specifically, the invention relates to an improved automatic speed control for locomotives which provides greater accuracy and stability of the locomotive speed as the load handled by this locomotive varies.

Speed control apparatus for automatically controlling the speed of humping locomotives is known in the railroad art. However, the known systems have limitations in retaining stability within the system while maintaining the speed within a selected band. In these systems, regulation of speed within a given tolerance requires a corresponding gain of the velocity error. That is, the closer the tolerance desired, the greater the gain required. However, as this gain is increased, the possibility of instability becomes greater. In hump locomotive applications, the load being pushed varies over a large range. For example, it is not uncommon to start with a train weighing 10,000 tons. As the cars are dropped over the hump, the load continues to decrease until the last car which may weigh only 10 tons or so. Since the tractive capability of the locomotive is constant, it can be realized that the overall system gain continues to increase as cars are humped. Thus in one prior system, due to the increased gain as the consist becomes lighter, instability occurs typically with 10 or fewer cars so that it is necessary to operate the locomotive manually. Another problem or limitation is the high setting on the brake pressure switch necessary to allow the locomotive operator to hold the train on the hump until a throttle position is achieved which will move the train upgrade. This high pressure setting hinders later operation as it requires excessive brake application to shut off the throttle when necessary to exercise manual control. A speed control system which eliminates these and other limitations is thus extremely desirable.

Accordingly, an object of my invention is an improved automatic locomotive speed control system.

Another object of the invention is a speed control system for hump locomotives which provides good speed regulation and improved operating stability.

A further object of my invention is automatic locomotive speed control apparatus with improved regulation of selected speed and a higher degree of stability.

Yet another object of the invention is speed control apparatus for a hump locomotive in which the concept of processing the error signal is shifted, when the speed error is reduced below a predetermined percentage of the selected speed, to achieve a more accurate response while retaining stability.

Still another object of my invention is a locomotive speed control system which obtains a desired speed by controlling a master power source output on the locomotive and also the locomotive throttle position, in proportion to a selected ratio of a desired speed, with an operational shift from a first to a second type processing when the speed error is reduced below a predetermined percentage of the desired speed.

A further object of the invention is an arrangement for controlling speed of a locomotive in which the difference between the actual and selected speeds, modified by the acceleration signal, is used directly to control power and throttle of the locomotive when the difference exceeds a predetermined percentage of the desired velocity and in which the difference signal is processed through an integrator network to provide hybrid control of the voltage signal controlling the power and throttle when the difference is less than the predetermined percentage of the desired velocity, the acceleration signal being used as an advance indication of the achievement of the desired speed to eliminate overrun.

Other objects, features, and advantages of my invention will become apparent from the following description when taken in connection with the appended claims and accompanying drawings.

SUMMARY OF THE INVENTION

The general system or arrangement embodying my invention includes a means for measuring the actual locomotive speed and converting this measurement into an analog voltage signal. The actual speed voltage signal is differentiated to provide an acceleration signal and is compared with an equivalent signal representing a selected or desired speed to develop an error signal. This error signal is processed through a two-condition hybrid network to provide a control voltage for a pulse width modulator and for a throttle control arrangement. The error signal, of course, may be positive or negative in accordance with the over or under speed condition. Its absolute value is measured in a separate circuit to determine if it is more than or less than a predetermined portion or percentage of the selected speed, for example, in one installation a 10% ratio. The level detected, that is, above or below the percentage, is registered to select a condition of the processing network. When the error signal is greater than this predetermined portion, the network is so connected that the resulting gain is equal to 1. In other words, the transfer function of the network is unity so that the error signal is equal to the control voltage. The acceleration signal is also incorporated into the final value of this control voltage to provide an anticipation of achieving the selected speed. This control voltage is then converted by a pulse width modulation means into a series of pulses, each having a width proportional to the level of the control voltage signal. This series of pulses is applied to control the output of the main locomotive propulsion source, for example, the main generator on a diesel-electric locomotive. As the locomotive speed increases, the pulse width increases as the error signal decreases, i.e., the actual speed approaches the selected speed. The variation in the pulse width is also controlled in part by the acceleration signal to anticipate the achievement of the selected speed.

When the velocity error is reduced to less than the predetermined portion of the selected speed, the register means acts to shift the processing network to a second condition which incorporates an integrator circuit into the processing loop for the velocity error signal so that the operation becomes of a hybrid nature. The control voltage now varies by three additive forcing functions. In addition to acceleration acting in anticipation, the control voltage varies directly proportional to the error signal but at one-half the gain. The integrator also acts to change the control voltage and corresponding locomotive tractive effort to reduce the error to zero. As the error signal becomes smaller, the rate at which the control voltage changes becomes slower. In the limit, the control voltage will retain a finite value at zero error. Thus the integrator may be thought of as having infinite but very slow acting gain.

The control voltage and the acceleration signal are also applied to a second or throttle control network. Here the control voltage drives a low frequency clock to operate a reversible counter network with the sense or direction, that is, the count up or down, normally determined by the polarity of the velocity error, as reflected by the control voltage. The output of the counter is decoded to select the locomotive throttle position in accordance with the value of the control voltage. During the time that the train brakes are engaged, that is, before the humping operation starts, the counter is held in its reset condition but immediately moves to a throttle position sufficient to hold the train on the upgrade when the brake pressure is released. The level of the acceleration of the train, once the throttle is positioned, is classified into one of three levels designated as low, moderate, and excessive. The classification output, in logic form, is combined with the sense or direction of the control voltage through a logic network to enable or inhibit the counter. The throttle position thus varies only when the control voltage is of some magnitude. When the control voltage approaches a dead band or the acceleration classification indicates an approach to the correct speed, further counting is inhibited to hold the existing throttle position to eliminate a speed overrun. Under this condition, the necessary minor speed changes are controlled only by the pulse width modulator.

BRIEF DESCRIPTION OF THE DRAWINGS

I shall now describe in broad outline the basic system including the invention and in greater detail one specific circuit arrangement embodying the details of my invention, referring from time to time to the accompanying drawings in which.

In each of the drawings, similar reference characters refer to the same or similar apparatus and/or functions.

DESCRIPTION OF THE ILLUSTRATED EMBODIMENTS

Figure 1:
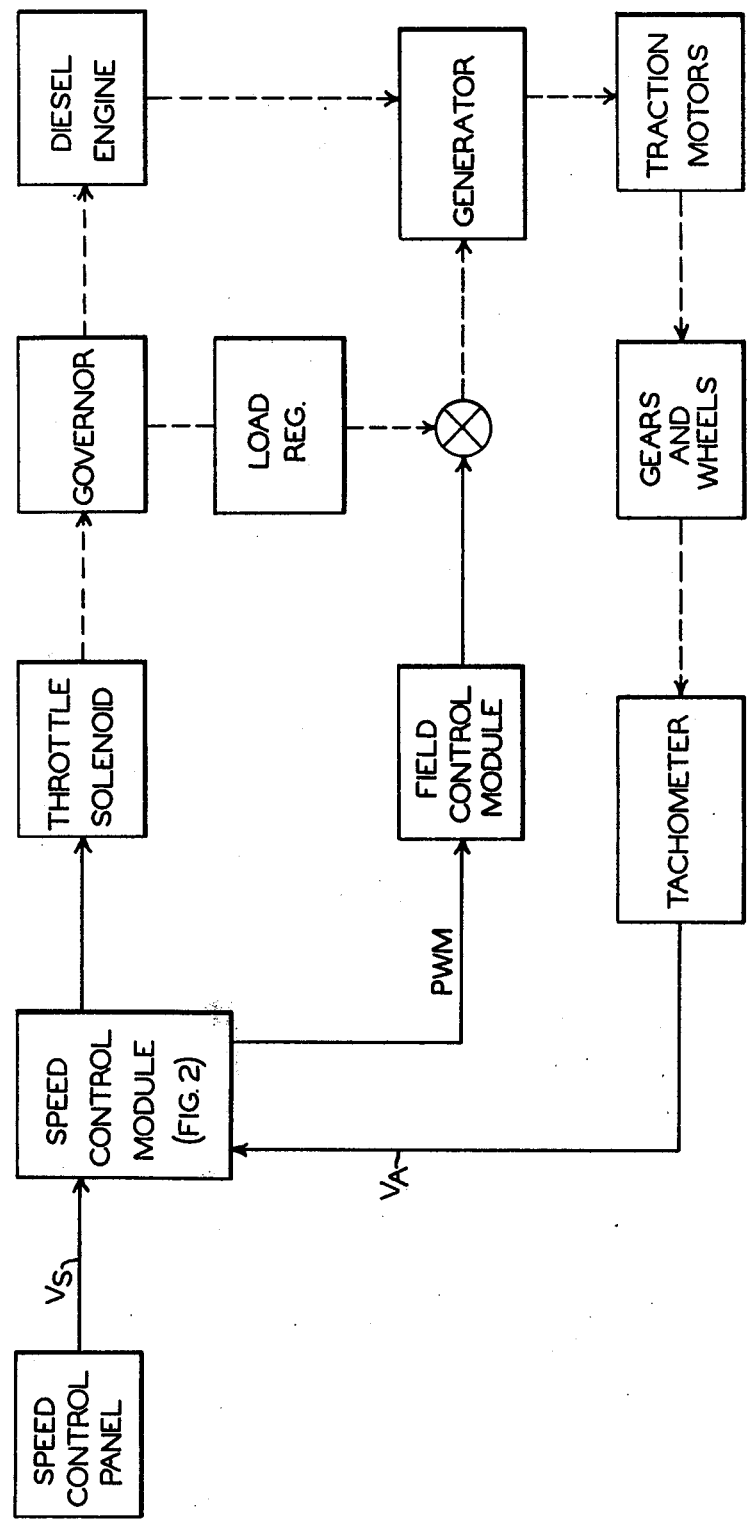
FIG. 1 is a conventional block diagram illustrating a basic locomotive speed control system into which the invention may be incorporated.

Referring first to FIG. 1, shown therein, in block diagram form, is an automatic speed control system for a locomotive, by way of a specific example, a diesel-electric locomotive used for humping in a classification yard. It is thus a low speed service, for example, moving at a fixed speed in the range of 1 to 5 mph in pushing the train upgrade to the hump where the cars are released to move by gravity to the proper classification track. In effect, the entire arrangement is a servo loop but with two control links to the locomotive propulsion. At the extreme left, the block represents the control panel in the locomotive cab on which the engineer or operator selects the desired humping speed. This is a voltage signal $V_S$ which is supplied to the speed control module, shown here as a conventional block but which will be shown and described in detail in connection with FIG. 2. A second input to the speed control module is an actual speed signal $V_A$ from a tachometer apparatus which measures the actual speed in any known manner. Signal $V_A$ is provided as or at least is converted to an analog signal so that it becomes a voltage input similar to the selected speed signal $V_S$. The speed control module provides two outputs. The first, in code format, is to the throttle channel which through a throttle solenoid apparatus and a governor device sets the throttle position to control the locomotive (diesel) engine speed. This control channel is a rough speed adjustment and varies the locomotive speed in relatively large steps.

The second output, designated PWM for pulse width modulation, is in the form of pulse signals of selected width and acts through a field control module to further vary the output of the locomotive generator which is supplying power to the traction motors. In one specific installation, the longer the pulse width, the greater the reduction in the generator power output so that if the speed control module fails, full manual control is available. The generator is thus controlled from two sources, the diesel engine driving speed through the throttle adjustment and the field through the PWM channel. The pulse width modulation or PWM channel provides fine adjustment of power or speed. The feedback from the motors is through the gears and wheels to the tachometer to generate the actual speed signal $V_A$.

Figure 2:
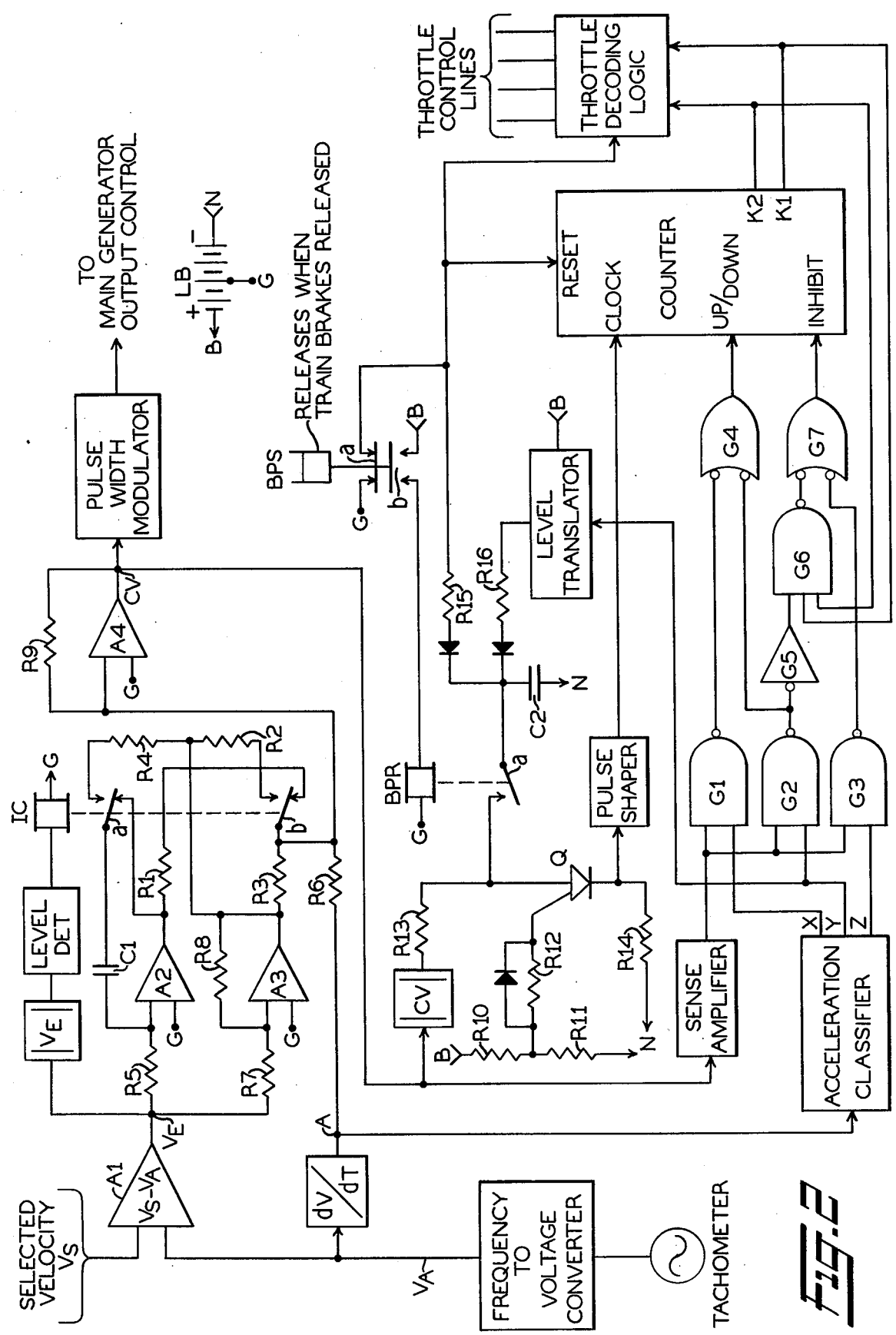
FIG. 2 is a circuit diagram, partly in schematic form, of the speed control apparatus embodying the invention.

Referring now to FIG. 2, a circuit diagram, partly in conventional block form, illustrates a specific speed control module arrangement for the block illustrated in FIG. 1. At the upper right, by conventional symbol, is illustrated a locomotive battery LB which supplies energy to the apparatus shown in FIG. 2. Elsewhere in FIG. 2, the reference B designates a connection to the positive terminal of this battery and the reference N, a connection to the negative terminal. A center, or at least an intermediate, terminal G is also used where a lower voltage is desirable for operating any of the apparatus. The terminal G may also be considered to be connected to the system ground in the usual manner. At the upper left is the input from the operator's control panel providing a voltage signal $V_S$ representing a selected locomotive speed. At the lower left is a symbol representing the tachometer which measures the actual locomotive speed, here shown specifically as a frequency signal. This frequency signal is converted by conventional apparatus into an analog or voltage signal representing the actual speed signal $V_A$ which is also differentiated in a conventional manner to provide a voltage signal A representative of the acceleration of the locomotive.

Signals $V_S$ and $V_A$ are compared or summed in the amplifier unit A1 to develop a velocity error signal $V_E$. Signal $V_E$ has a positive or negative characteristic $(+/-)$ as signal $V_A$ is greater than or less than signal $V_S$, respectively, the inputs to amplifier A1 being adjusted and connected to provide this result. The absolute value of signal $V_E$ is determined in a conventional unit designated by the block $|V_E|$. The output of unit $|V_E|$ is a signal applied through a conventional level detector unit to energize integrator control relay IC. Sufficient energy is output to pick up relay IC only if signal $|V_E|$ is greater than a predetermined portion of the selected velocity signal $V_S$. For example, in one specific installation, relay IC is sufficiently energized to pick up only when $V_E$ is greater than 10% of $V_S$. Relay IC is shown in its released position but obviously, when the locomotive is halted as it is initially before humping begins, relay IC is picked up to close its front contacts *a* and *b*.

The processing network for signal $V_E$ includes amplifiers A2, A3, and A4, capacitor C1, contacts $a$ and $b$ of relay IC, and various resistors designated R1 through R9. This network processes the input signal $V_E$ at the output of amplifier A1 into a control voltage CV at the output of amplifier A4. It is to be noted that, by preselection of the elements of the network, the gain of amplifier A3 is fixed at $-1$ and resistors R1, R2, and R3 are of equal value, which is also twice the resistance of resistor R9. The signal processing network has two operating conditions depending upon whether signal $V_E$ is greater than or less than the predetermined portion or percentage of signal $V_S$, that is, in this present example, 10% or 0.1 $V_S$. In other words, two operating conditions for the processing network are established as relay IC is picked up or released, that is, as its front or back contacts close, due to the level of energy received through the absolute value, level detector path from amplifier A1. Assuming first that $|V_E|$ is greater than the selected percentage (0.1) of $V_S$, for example, during the underspeed condition at the start of a humping operation, relay IC is picked up so that capacitor C1 is connected by front contact $a$ of this relay to maintain the voltage through resistor R4 equal to the output of amplifier unit A3. It is to be noted that the output connections from amplifier A2 are at this time disconnected at back contacts $a$ and $b$ of relay IC, both of which are open. Now the gain of amplifier A4 is expressed by the symbolic term $-R9/(R2||R3)$. Given the value relationship between the resistors, the gain of amplifier A4 thus equals $-1$. Since the gain of amplifier A3 is defined as being $-1$, the transfer function of this network is unity. Therefore, ignoring the effect of the acceleration signal A, control voltage CV is equal to the error signal $V_E$ when relay IC is picked up.

When the velocity error $V_E$ is reduced so that it is equal to or less than the predetermined percentage of signal $V_S$, herein 0.1 $V_S$, relay IC releases and shifts the network to its second or hybrid operating condition. This condition, in humping operations, generally occurs as the locomotive comes up to the desired speed. Release of relay IC opens its front contacts $a$ and $b$ to interrupt all circuits through resistors R2 and R4. Back contacts $a$ of relay IC closes to connect capacitor C1 to the output of amplifier A2 so that the capacitor now forms an integrating feedback circuit path, that is, amplifier A2 becomes an integrator. At the instant of transfer by contact $b$ or relay IC, the current through resistor R2 to the summing junction input of amplifier A4 is interrupted. However, since resistor R1 is equal to resistor R2 in value and capacitor C1 has been maintained at the output voltage of amplifier A3, there is no instantaneous change in control voltage CV at the output of amplifier A4. Therefore, the transition from the simple regulator control to the hybrid form of operation, involving the integrator including amplifier A2, is made smoothly without instantaneous change in the locomotive speed control.

Figure 3:
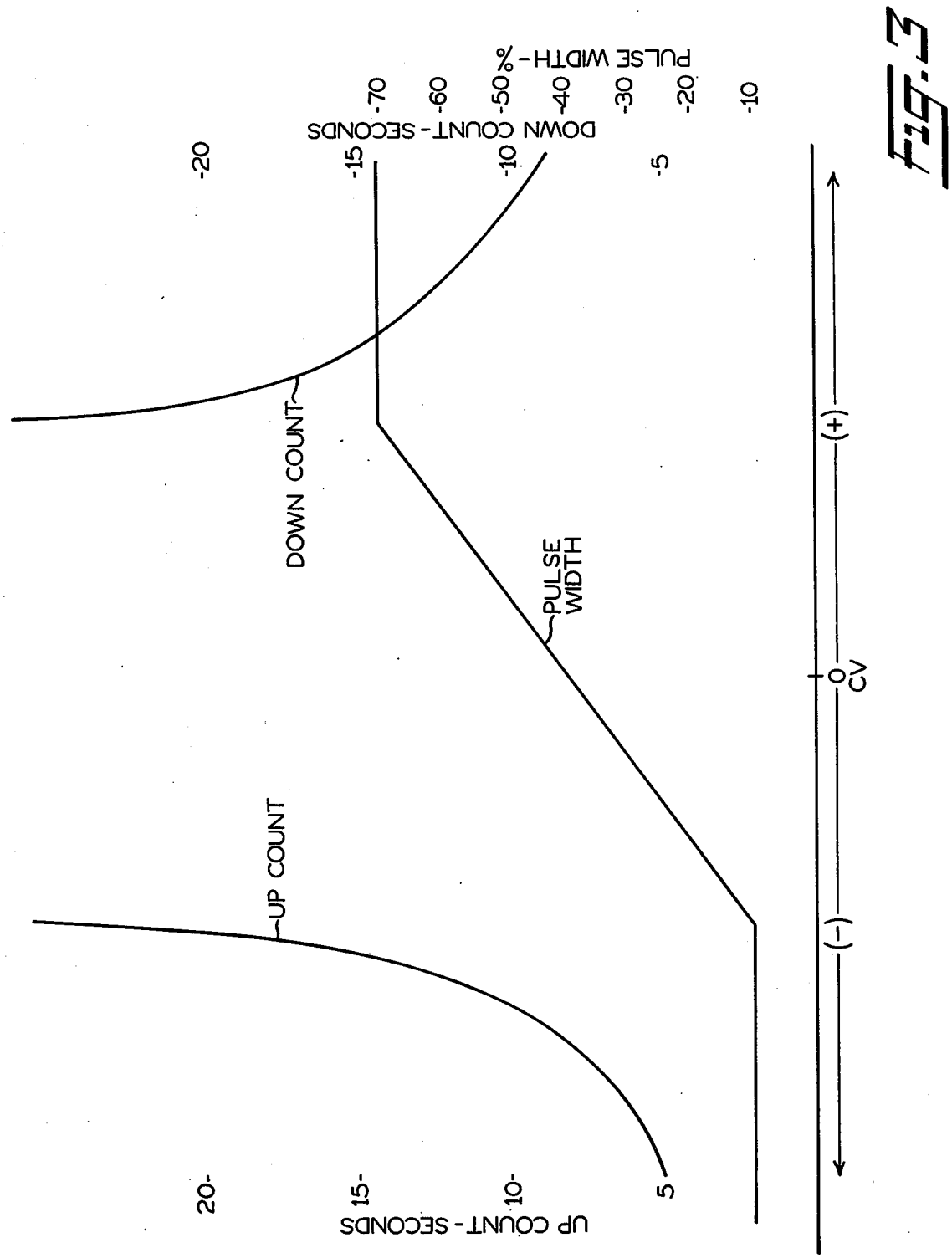
FIG. 3 is a chart showing the relationship between selected functions in the operations of the circuit arrangement of FIG. 2.

The control voltage CV, regardless of which processing circuit form is active, is converted to a series of pulses having a proportional pulse width by the Pulse Width Modulator unit shown by the conventional block. The main generator responds to the PWM signals to derive a proportional output to vary the locomotive speed. The pulse width or duration of each pulse, in other words, the percent on-time, varies in accordance with the level and polarity of control voltage CV. For example, when signal CV has a negative characteristic during underspeed conditions, the pulse width duration is at a low level. As signal CV becomes more positive, the pulse width or duration increases. This occurs as the actual speed $V_A$ increases. A specific example is shown in the chart of FIG. 3, which is taken from one specific installation of the apparatus on a hump locomotive of the diesel-electric type. In this specific installation, the locomotive main generator output decreases as the pulse width increases. It is to be understood, however, that other arrangements may be used depending upon the characteristics of the diesel locomotives to which the speed control apparatus is being applied. Referring to the straight line designated as the pulse width, it is to be noted that minimum and maximum values of pulse width are in effect at the extreme values of voltage CV in both the positive and negative directions. That is, the pulse width has a maximum of 70% when voltage CV is greater than a predetermined positive value while a minimum value of 10% is in effect when voltage CV is below a predetermined negative value. Normally speed control is initiated with the locomotive at stop, just prior to the start of the humping operation. The control voltage CV is thus at its maximum negative value under these conditions. In humping operations, however, rarely will voltage CV get to the maximum positive condition where the maximum pulse width is in effect.

A value of zero for voltage CV is no more ideal than any other value. Most speed regulation systems for this purpose must operate with some finite error in order to develop the proper tractive effort. If zero error happens to produce the proper pulse width and corresponding tractive effort, the system can operate at zero error. If, as is more frequently the case, zero error does not produce the proper pulse width, then the system will assume whatever error is necessary to run at a constant speed. The amount of error that is acceptable determines the gain. If it is desired to operate with very little error, it is necessary to use very high gain. There are limits, however, to how high the gain can be raised because of system stability. If the gain is increased too much, the system becomes unstable. The novelty in the system disclosed herein is that control voltage CV becomes an independent function of error, forcing the error to zero. For example, assume a system for which zero error produces 50% power. If the selected speed is 2 mph and if the particular grade and load is such that 50% power is exactly correct for 2 mph, the system will operate at zero error. On the other hand, if 50% is too much power, an error signal will develop because the train speed $V_A$ is too high and the power is reduced. It will be necessary for the system to operate at some velocity error (velocity will be a little on the high side) in order to produce an acceptable tractive effort.

In this disclosed system, however, the pulse width is independent of the velocity error in the steady state condition. It is true that, as the demand for power decreases, the locomotive will tend to go faster. But the resulting velocity error will force the integrator to adjust the pulse width and reduce the corresponding velocity error to zero. Note that the output of the integrator will remain fixed at any value whenever its input or signal $V_E$ is zero. Since the grade and load variations occur slowly enough, the integrator can keep up and maintain signal $V_E$ at nearly zero.

The increase in the pulse width as control voltage CV becomes less negative is due in part to the decrease in the velocity error signal $V_E$ as signal $V_A$ increases. But the change in control voltage CV is also due in part to the acceleration signal A applied through resistor R6 to the input summing junction for amplifier A4. This signal acts in anticipation of the achievement of or at least the approach to the desired speed $V_S$. In the first condition, signal A tends to shift voltage CV from a direct equality with signal $V_E$ in a plus or minus direction as A is positive (acceleration) or negative (deceleration). When relay IC releases (signal $V_E$ reduced to the predetermined percentage of signal $V_S$) and puts the integrator amplifier A2 into the loop, the pulse width no longer bears its proportional relationship to the velocity error. Instead, the pulse width will assume an appropriate value to force the velocity error to zero. This is true because if there is a velocity error, the output of the integrator will change in a direction, and hence change the pulse width to drive the velocity error to zero. The output of the integrator will remain at the value it had to assume to drive the velocity error to zero.

The integrator amplifier A2 and its feedback capacitor C1 are designed to have an infinite gain but to react slowly to change. The constant of integration is chosen on the basis of making it fast enough to keep up with the long-term propulsion demand changes which occur gradually as the weight of the train consist is decreased and the slope of the hump changes. Minor propulsion command changes which occur quickly due to slight irregularities in track alignment are handled by the combined effect of the regulator system and the acceleration feedback, both of which act immediately to force a correction. For example, when moving at a constant speed, a certain steady state propulsion effort is needed dependent upon the grade and load. If a section of track of unusually tight gage is encountered or an unusual change in load occurs as an extra heavy cut is uncoupled over the hump, the velocity will suddenly decrease or increase due to the change in track or load resistance, respectively. The velocity error reacts through amplifier A3 and resistor R3 to immediately change the level of voltage CV. Additionally, the resultant deceleration or acceleration forces current through resistor R6 to also vary the control voltage. Both of these actions will force the pulse width to vary sufficiently to change the generator output to accommodate the change in velocity and force the velocity error again towards zero.

The throttle control network shown in the lower half of FIG. 2 will now be described. This network comprises a clock circuit, a direction sensor, an acceleration logic network, a counter means, decoding logic for the throttle control lines, and various associated apparatus. The counter shown by the block at the lower right is any conventional apparatus of the reversible counting type. A pulse applied to the clock input terminal actuates the stepping of the counter, the pulse frequency determining the counting rate. Input to the UP/DOWN terminal determines the count direction, that is, whether to add or subtract the count pulse. For example, in one specific type assumed herein, a logical one input causes the counter to count up, that is, increase the count, while a logical zero input causes a reduction in the count, that is, a down counting action. A logical one input to the inhibit terminal causes the counter to cease operation, i.e., not respond to any clock input pulses, but to hold the existing count level. An input to the reset terminal causes the counter to reset to its at-rest or zero condition. The counter output, that is, the count status, appears at terminals K1 and K2 and is applied to the throttle decoding logic, a conventional network which determines the throttle position in accordance with the existing count. The decoding unit is of a type arrangement that the same reset pulse which returns the counter to zero will cancel or reset the logic to its at-rest condition.

The clock network comprises an absolute value circuit $|CV|$, a transistor Q, a primary biasing resistor network including resistors R10, R11, and R12, capacitor C2, a brake pressure release relay BPR, a Pulse Shaper circuit, and limiting resistors R13 and R14. The heart of the clock network is the programmed unijunction transistor Q, illustrated by the conventional symbol. Gate electrode bias for this transistor is established by the resistor network including resistors R10 and R11, connected in series between terminals B and N of battery LB, and resistor R12. This network determines the voltage required on the anode electrode to trigger transistor Q to its conducting condition. The cathode of transistor Q is connected to terminal N through resistor R14. Anode voltage for transistor Q is established, after the initial moment, by the absolute value of the control voltage CV determined by the conventionally shown unit. Voltage CV, of course, is supplied from the output of amplifier A4 in the manner previously discussed. The voltage charge on capacitor C2 is also initially applied, that is, summed, to the anode input of transistor Q over front contact $a$ of relay BPR.

Relay BPR is normally deenergized and is controlled by a brake pressure switch BPS. This switch is preset to release when the brake pipe pressure in the train is reduced to a predetermined value, for example, 5 psi. When the brake pipe pressure is greater than this predetermined limit, switch BPS is in the position to close the circuit through its contacts $a$ so that a connection is made from terminal G of battery LB to a circuit leading to the reset terminals of the counter and the throttle decoding logic and also to resistor R15. When the brake pressure is reduced below this predetermined value, switch BPS releases to close a circuit through its contacts $b$ from terminal B to the winding of relay BPR and thence to terminal G. This energizes the relay, causing it to pick up and close its front contact $a$. In the at-rest condition, with the circuit through contacts $a$ of switch BPS closed, capacitor C2 is charged to the voltage level of terminal G of battery LB, which is considered in the illustrated system as the zero voltage or a logic 1 level. A logic 1 on the reset line causes the counter to reset.

The up/down and inhibit inputs to the counter are controlled through a logic network with inputs from an acceleration classifier device and a sense amplifier. This latter unit receives the control voltage CV as an input and detects its positive or negative condition. The output signal from the sense amplifier is a logic 1 if an increase in speed is required and a logic 0 if a decrease is required. The acceleration classifier receives as an input the acceleration signal A and detects its level in accordance with predetermined limits. If the acceleration is low, that is, less than a predetermined minimum level, the acceleration classifier outputs a logic 1 signal on lead X. Above this level, lead X carries a logic 0 signal. If the acceleration is detected as being excessive, that is, greater than a predetermined upper level, a logic signal 0 is output on lead Y which otherwise carries a logic 1 signal. If the acceleration is in the moderate range, that is, greater than the predetermined minimum but less than this upper maximum above which it becomes excessive, a logic 1 signal is output on lead Z which otherwise carries a logic 0 signal.

The output of the sense amplifier is applied to one input of each of the NAND gates G1, G2, and G3. A second input to gate G1 is supplied from the acceleration classifier by lead X which represents the low acceleration signal. The output of gate G1 is applied as one input to a NOR gate G4 and thence to the UP/DOWN input of the counter. A second input to gate G4 is received from the output of gate G2 which receives its second input from lead Y of the acceleration classifier, that is, the excess acceleration lead. The Z output from the acceleration classifier is applied as the second input to NAND gate G3. The output of this last gate is applied as one input to a NOR gate G7 whose output is applied directly to the inhibit terminal of the counter. A second input for gate G7 is received from the output of NAND gate G6 which has three inputs. One of these inputs is received from gate G2 through an inverter gate G5. The other two inputs to gate G6 are received from the output terminals K1 and K2 of the counter. It is to be noted that output Y from the acceleration classifier is also applied to a Level Translator circuit which produces a positive analog signal output when acceleration is excessive, that is, when a logic 0 output signal is received from the acceleration classifier. The output of this level translator is applied through resistor R16 as an additional source for charging capacitor C2.

To discuss the operation of the apparatus, it is assumed that it is used on a hump locomotive which is to move a train up a classification yard hump starting from a stopped condition. Briefly, no throttle action, and thus no propulsion power, occurs until the locomotive brakes are released and relay BPR picks up. After this initial positioning of the throttle to a preselected starting point, control is exercised depending upon a combination of the speed change required and acceleration. If acceleration is in the low range, the throttle will advance if necessary for increased speed. However, if acceleration is in the moderate range, the throttle will remain unchanged while the detection of an excessive acceleration causes the throttle to retard. The clock which initiates the throttle changes is controlled by control voltage CV instead of the velocity error signal $V_E$. Thus, instead of throttle changes being on the basis of velocity error, they are initiated on the basis of pulse width residing at either extremity, that is, at either maximum or minimum limit. In other words, not considering the overall supervision based on acceleration, the throttle will advance if the pulse width remains for a prolonged period at its minimum width and will retard if the pulse width remains at the maximum pulse width. This is indicated in chart form in FIG. 3 to which reference is also made. Referring to the block diagram and the chart, the graph shows a relationship of pulse width and the counting of clock pulses for positive and negative values of control voltage CV. It is to be noted that there is a band of voltage CV to which the clock does not respond and which corresponds to the linear operating region of the pulse width control. This is accomplished by the R10, R11, R12 resistor network which establishes the voltage to which capacitor C2 must charge before transistor Q is triggered. The frequency of the clock, i.e., the interval between the triggering of transistor Q, is determined by the voltage output of the absolute value circuit |CV|. Translated into dynamic speed regulation performance, the control using acceleration for supervision insures that the appropriate throttle notch is achieved for accelerating the train.

The explanation of the throttle logic sequence starts with the train at rest, which is the condition shown in the circuit arrangement of FIG. 2. With the brakes applied, switch BPS is picked up so that its contacts a complete the circuit for voltage to flow from terminal G through resistor R15 to charge capacitor C2. This is considered the zero voltage or logic 1 level in the system so that the application of this to the reset terminals of the counter and the throttle decoding logic holds these units in their at-rest (no-count) condition. When the brakes are released on the train, or at least the brake pipe pressure reduces below the preselected pressure (5 psi.), switch BPS releases, closing the circuit through its contacts b to energize relay BPR. When front contact a of relay BPR closes, the existing voltage charge on capacitor C2 is applied to transistor Q. This exceeds the threshold voltage set by resistors R10, R11, and R12 so that the transistor immediately conducts. When the transistor conducts, a pulse is applied to the clock input of the counter through the Pulse Shaper network connected to the transistor cathode. The counter steps to its first position and immediately advances the throttle to notch 3, which on most diesel locomotives is the lowest acceptable operating position. With a notch 3 throttle position, sufficient tractive effort is provided to at least hold the train on the hump grade so that no roll back occurs. Thus switch BPS may be set at a relatively low brake pressure, for example, 5 psi., and still prevent train roll-back prior to the step-up of the throttle. This avoids any problems in handling the train due to a high brake pressure setting on this switch.

At this point, the throttle can either advance, retard, or remain at notch 3 depending upon the acceleration. Since at the beginning the locomotive is greatly underspeed, output of amplifier A4, that is, voltage CV, is high but with a negative characteristic so that the sense amplifier output is a logic 1. The next clock pulse, referring to FIG. 3, will be in the UP direction and will occur in approximately 5 to 10 seconds in this specific showing. If the train does not begin to move, or at least acceleration is extremely low, the X and Y leads of the acceleration classifier are at the logic 1 signal level. The outputs of NAND gates G1 and G2 are then at logic 0 so that NOR gate G4 outputs a logic 1 to cause the counter to count UP when the next clock pulse occurs.

Frequently a static friction condition makes it difficult to get a train moving up the hump grade and requires a higher throttle position to start the train than is necessary after movement actually begins. If, for example, the throttle advances to notch 4 to start the train, acceleration when the train starts may then become of the excessive classification. Thus the output on leads X and Y from the acceleration classifier will each be a logic 0 signal. Lead Z will also have a logic 0 but this is immaterial to the present operation. Even though the sense amplifier output is a logic 1, calling for an increased speed, the outputs of gates G1 and G2 will be logic 1 signals. The output of gate G4 thus becomes zero which, applied to the counter, actuates a DOWN count for reduced speed. The logic 0 signal on lead Y is also applied to the Level Translator and results in a positive output from this unit. Charging current thus flows through resistor R16 to capacitor C2 to reduce the clock time, that is, the interval between the successive clock pulses. In other words, under an excessive acceleration condition, transistor Q is triggered more frequently. These faster clock pulses reduce the time during which too high a throttle position is maintained, since the counter is reducing its count to cause the throttle decoding logic to set back the throttle. The rate of approach to the selected speed is thus reduced to help reduce the amount of speed overshoot which may occur. When the acceleration factor is reduced to the moderate range so that lead Z carries a logic 1 signal, gate G3 output becomes zero since the sense amplifier is still outputting a logic 1 signal as more speed is needed. NOR gate G7 now has at least one input at logic 0 and provides an inhibit signal to the counter. Thus when acceleration becomes moderate, even though the locomotive is underspeed, the throttle is held in its existing position.

While the throttle control portion of the apparatus is functioning as the train starts up, the pulse width modulation of the main generator is also functioning. Initially with a large underspeed condition, control voltage CV is equal to velocity error signal $V_E$ and has a negative polarity. Voltage CV is converted into a proportional pulse width and the generator responds to develop a proportional output. The pulse width is at the preselected minimum under these conditions, for example, 10% as shown in FIG. 3. As the actual velocity signal $V_A$ increases, voltage CV becomes less negative, that is, approaches the zero position or point of the FIG. 3 chart. The acceleration signal also affects the value of voltage CV. As the error signal $V_E$ decreases to the predetermined percentage, for example, 10% of the selected speed $V_S$, the hybrid network is created. When relay IC releases, amplifier A2, with the feedback path through capacitor C1, acts as an integrator network. As previously explained, with this integrator in the loop, the pulse width no longer has a direct proportional relationship to the velocity error but assumes an appropriate value to force the velocity error to zero. Since the integrator has infinite gain but reacts very slowly, its output will remain at the value it assumed in driving the velocity error to zero. The hybrid network is thus responsive to the long-term propulsion demand changes which occur gradually as the weight of the consist is decreased and the slope of the hump changes.

Once a reasonably steady state of the locomotive speed is achieved through the throttle and pulse width functions, minor propulsion changes which occur are handled by the combined effect of the regulator system and the acceleration feedback. Both act immediately to force a correction. For example, when moving at a constant speed, a certain steady state propulsion effort of the locomotive is needed dependent upon the grade and the consist load. If there is a change in velocity due to external conditions, such as a sudden speed decrease due to a section of tight gage track, the velocity error signal reacts through amplifiers A3 and resistor R3 to increase propulsion current. Additionally, the resulting deceleration forces current through resistor R6 to increase the propulsion current. Thus no change in the throttle position is required and the pulse width is adjusted in whatever minor amount is necessary to correct the speed variation.

The portion of the system for pulse width control of minor changes in the speed can be characterized as operating as a simple regulator system when the velocity error is very large to maintain the advantage of this type system to act quickly to changes in requested speed. Further, the pulse width system automatically and smoothly transfers from the regulator to the hybrid operation when the speed error is reduced to a preset factor. This reduces the fast acting gain with an attendant improvement in stability but retains a steady state speed accuracy due to the zero error seeking characteristic of the integrator. The system maintains its ability to make minor adjustments of the speed. However, the entire system uses the throttle adjustment for large and initial speed changes required to get the train underway under heavy load and difficult grade.

The locomotive speed control apparatus of my invention thus provides an improved control with accuracy and stability in which the acceleration function is used to reduce the power in anticipation of the approach to the correct selected velocity. Through a logic network and feedback control of the clock, particularly when acceleration becomes excessive, a counter device which determines the throttle position is inhibited or stepped back to hold or reduce the throttle when the acceleration factor indicates the approach to the selected speed even though the locomotive may still be underspeed. Control of the locomotive speed is adjusted in advance to prevent overshoot of the desired speed and for providing a control voltage to the pulse width modulator for finer speed adjustments. The speed control operates as a simple regulator when the velocity error is large to maintain the advantage of quick reaction to changes in speed. The pulse width modulation arrangement shifts to a hybrid type network operation when the error signal is reduced to a preselected percentage of the selected speed with an automatic and smooth transition from the regulator to the hybrid operation. However, this hybrid circuit arrangement reduces the fast acting gain to improve the stability of the speed control. It also provides better steady state speed accuracy due to the zero-error-seeking characteristic. The arrangement of the invention thus efficiently and economically provides a locomotive speed control system which is both accurate and stable.

Although I have shown and described but one specific embodiment of the locomotive speed control apparatus embodying the invention, it is to be understood that modifications and changes within the scope of the appended claims may be made without departing from the spirit and scope of my invention.

Having thus described the invention, what I claim and desire to obtain by Letters Patent is:

1. In a locomotive speed control system, the combination comprising,
    (a) a signal processing means operable for processing an input signal into a control signal at an output terminal and having a first operating condition for transferring an input signal without change to form an output control signal and a second operating condition for producing a non-proportional output control signal in response to a variable input signal,
    (b) a speed signal source coupled for supplying said speed signal, representing the difference between a selected locomotive speed and the actual locomotive speed, as an input signal to said processing means,
    (c) a level detection means responsive to the absolute value of said speed signal and coupled for shifting said processing means between its first and second conditions as said speed signal is greater than or less than, respectively, a predetermined percentage of said selected speed,
    (d) a first speed control means coupled to receive said output control signal from said processing means and operable in response thereto for varying the locomotive speed in small adjustment steps to drive said difference speed signal to zero, and (e) a second speed control means coupled to receive said output control signal from said processing means and operable in response thereto for varying the locomotive speed in large adjustment steps to quickly effect speed changes.

2. A speed control system as defined in claim 1 which further includes, (a) another source providing a locomotive acceleration signal related to the actual locomotive speed,
 (1) said other source connected to said processing means for modifying said output control signal in accordance with a level of acceleration which reflects an approach of actual speed to said selected speed,
 (2) said other source also connected to said second speed control means for modifying the large step selection of locomotive speed when the acceleration signal is such as to indicate a level of acceleration which may produce an overshoot of the selected speed.

3. A speed control system as defined in claim 2 in which, (a) said first speed control means includes a pulse width modulator coupled for receiving an output control signal from said signal processing means and responsive thereto for generating a series of pulses having a width proportional to the level of said control signal, (b) said pulse width modulator further coupled for applying said pulses to a propulsion power source of the locomotive to vary the traction power output to control locomotive speed.

4. A speed control system as defined in claim 3 in which said second speed control means comprises, (a) a clock means coupled to the output of said processing means and responsive to said output control signal for generating periodic stepping pulses when the control signal voltage exceeds a predetermined absolute value, (b) a sense amplifier also coupled to the output of said processing means for determining in response to the control signal polarity a requirement for locomotive speed increase or decrease, (c) an acceleration classifier means coupled to said other source and responsive to said acceleration signal for providing a selected plurality of output signals in accordance with the detected level of acceleration, (d) a reversible counter means coupled to a locomotive power source for varying the speed in accordance with a recorded count, (e) said counter means controlled by said clock means, said sense amplifier, and said acceleration classifier means for normally stepping up or down in accordance with a registered speed increase or decrease requirement, respectively, when a stepping pulse is generated by said clock means,
 (1) said classifier means responsive to an excessive acceleration input level for overriding control of said counter means by said sense amplifier for reversing the normal stepping direction,
 (2) said classifier means further responsive to a moderate acceleration input as said locomotive approaches the selected speed for inhibiting operation of said counter means while maintaining locomotive speed control by said pulse width speed control.

5. Locomotive speed control apparatus, comprising in combination, (a) a source of a selected speed signal representing desired speed, (b) a source of an actual speed signal and an associated acceleration signal, (c) means connected to both said sources for comparing the received speed signals to generate a velocity error signal representing the level and direction of the difference between the actual and desired speeds, (d) modulating means responsive to the level and polarity of an input control voltage for varying the output of a locomotive power source to equalize said selected and actual speed signals, (e) a level detection means coupled to receive said velocity error signal and operable to a first and a second condition for registering the absolute value of said signal as greater than or less than, respectively, a predetermined percentage of said selected speed signal, (f) a signal processing network coupled to receive said velocity error signal input and controlled by said level detection means for supplying said velocity error signal without change as a control voltage input to said modulating means when said level detection means is in its first condition and for generating a non-proportional control voltage input in accordance with input and output variations when said level detection means is in its second condition.

6. Locomotive speed control apparatus as defined in claim 5 in which, said signal processing network is further controlled by said acceleration signal for adjusting said control voltage input to said modulating means in accordance with the acceleration level to prevent overrun of the desired speed when achieved.

7. Locomotive speed control apparatus as defined in claim 6 in which, (a) said locomotive power source is an electric generator driven by a diesel engine and connected to supply power to traction motors, and which further includes, (b) throttle control apparatus coupled for controlling the throttle position of said diesel engine to vary the power driving said electric generator, (c) said throttle control apparatus coupled to said signal processing network and responsive to said control voltage for positioning said throttle in accordance with the level and polarity of said control voltage, (d) said throttle control apparatus also coupled to said acceleration signal source and responsive to said acceleration signal for modifying the throttle position to prevent overrun as the actual speed approaches the desired speed.

8. Locomotive speed control apparatus as defined in claim 7 in which said signal processing network comprises, (a) a first amplifier circuit network coupled for receiving said velocity error signal and completed by said level detection means only when in its first condition to have a unity transfer function for supplying the input velocity error signal as an output control voltage, (b) a second amplifier circuit network also coupled for receiving said velocity error signal and completed by said level detection means only when in its second condition to include an integrating circuit path and to have a slow acting gain function for supplying an input control voltage which is nonproportional to the input velocity error signal to cause the control voltage to drive the velocity error signal to the zero level.

9. Locomotive speed control apparatus as defined in claim 8 in which,
  (a) said first amplifier circuit network includes a first and a second amplifier circuit connected in series, said first amplifier circuit having a unity gain factor,
    (1) said second amplifier conditioned by said level detection means in its first condition to also have a unity gain factor, whereby said velocity error signal is transferred without change to the input of said modulating means, and,
  (b) said second amplifier circuit network includes said first and second amplifier circuits and an integrator amplifier circuit connected in parallel with said first amplifier circuit by said level detection means in its second condition, for providing a slow acting gain function to said signal processing network to cause said control voltage to drive said velocity error toward a zero level.

10. A hybrid signal processing circuit network for transferring a variable input signal from a selected source into a control voltage output, comprising,
  (a) a level detector means coupled to said source and responsive to the absolute value of an input signal to operate to a first or a second position for registering that input signal as greater than or less than a preselected level, respectively,
  (b) a first amplifier circuit having a unity gain and coupled to said source for receiving said variable input signal,
  (c) an output amplifier circuit conditioned to have a unity gain when said level detector means occupies its first position and coupled in series with said first amplifier circuit for providing a unity transfer function for said input signal into said control voltage output,
  (d) an integrator circuit completed when said level detector means occupies its second position and coupled to said source for receiving said variable input signal,
  (e) said level detection means further coupled, when occupying its second position, for connecting said first amplifier circuit and said integrator circuit in parallel and said parallel circuits in series with said output amplifier circuit for providing a control voltage output which is non-proportional to the corresponding variable input signal.

11. A signal processing circuit network as defined in claim 10 which further includes,
  a feedback circuit means coupling the control voltage output to said source for driving said variable input signal toward zero when said level detector means occupies said second position.

12. A signal processing circuit network as defined in claim 11 in which,
  (a) said variable input signal may have either polarity, and in which said level detector means includes,
  (b) an absolute value circuit coupled for receiving said input signal and responsive thereto for determining the absolute value of the received signal without regard to polarity,
  (c) a level detector circuit coupled to said absolute value circuit for detecting when the determined absolute value is less than said preselected value, and,
  (d) register means controlled by said level detector circuit for operating to a first and a second position as said absolute value is more or less than said preselected value, respectively,
  (e) said regulator means coupled to complete said integrator circuit and connect said integrator path in parallel with said first amplifier when in said second position.

* * * * *

UNITED STATES PATENT AND TRADEMARK OFFICE
CERTIFICATE OF CORRECTION

PATENT NO. : 4,118,774

DATED : October 3, 1978

INVENTOR(S) : Raymond C. Franke

It is certified that error appears in the above-identified patent and that said Letters Patent are hereby corrected as shown below:

Column 14, line 67, delete "output" and insert --input--

Column 16, line 38, delete "regulator" and insert --register--

Signed and Sealed this

Fifth Day of June 1979

[SEAL]

Attest:

RUTH C. MASON
*Attesting Officer*

DONALD W. BANNER
*Commissioner of Patents and Trademarks*